Dec. 21, 1954  M. P. WINTHER ET AL  2,697,368
AUTOMOTIVE TRANSMISSION AND RETARDER
Filed Jan. 21, 1952  7 Sheets-Sheet 1

FIG. I.

Martin P. Winther,
Andrew S. Gill, Jr.,
Inventors.
Koenig and Pope
Attorneys.

Dec. 21, 1954     M. P. WINTHER ET AL     2,697,368
AUTOMOTIVE TRANSMISSION AND RETARDER
Filed Jan. 21, 1952     7 Sheets-Sheet 2

← DRIVE SECTION I →

Martin P. Winther,
Andrew S. Gill, Jr.,
Inventors.
Koenig and Pope,
Attorneys.

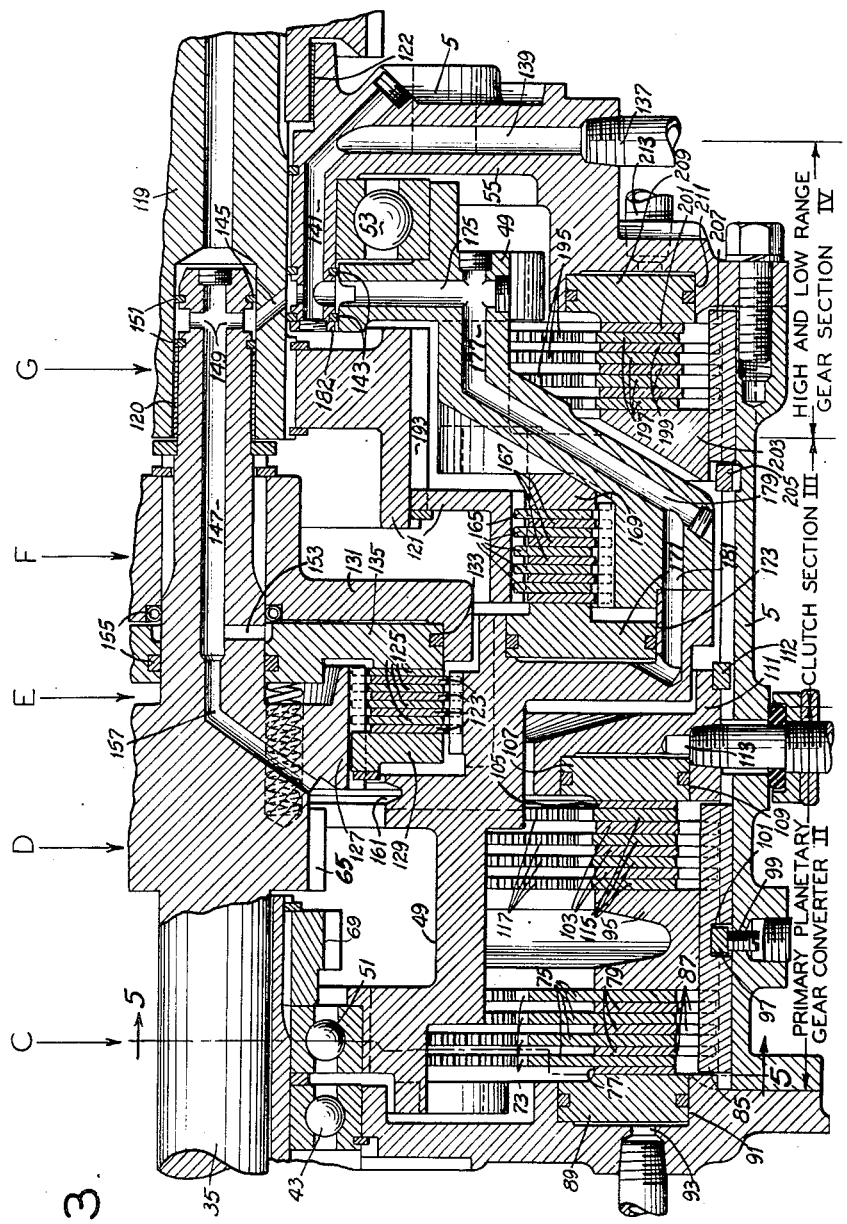

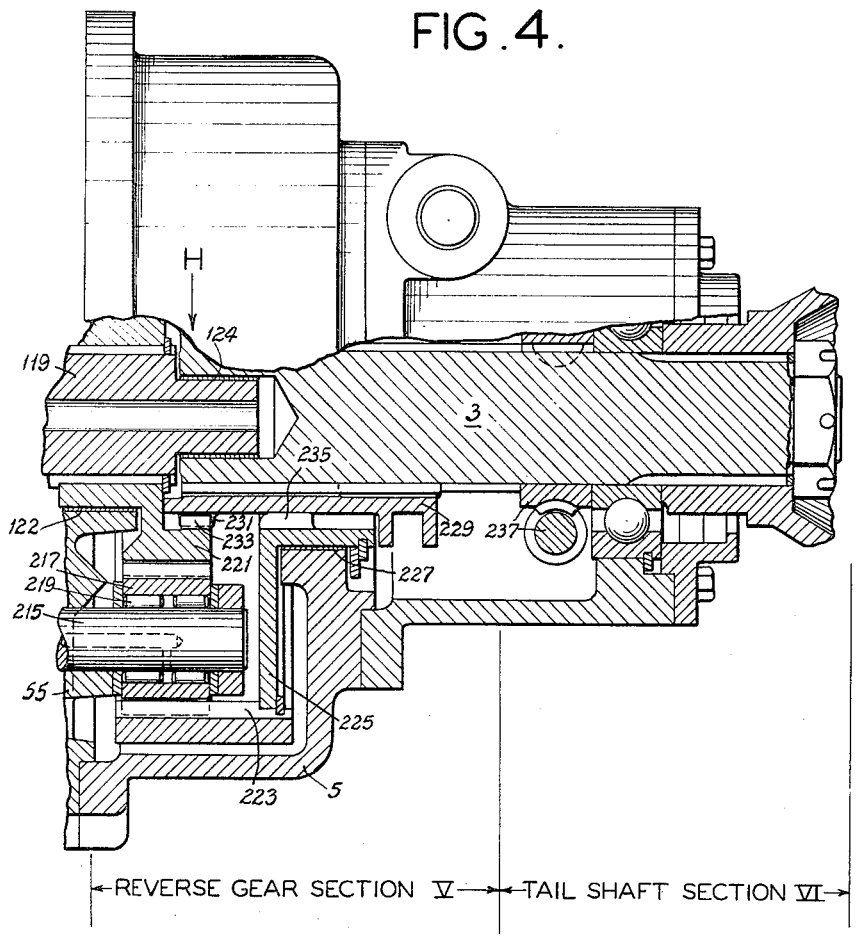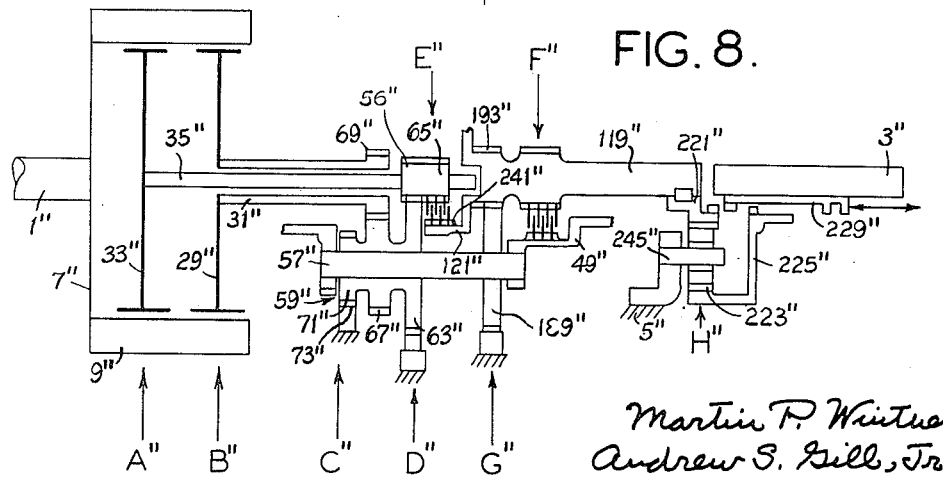

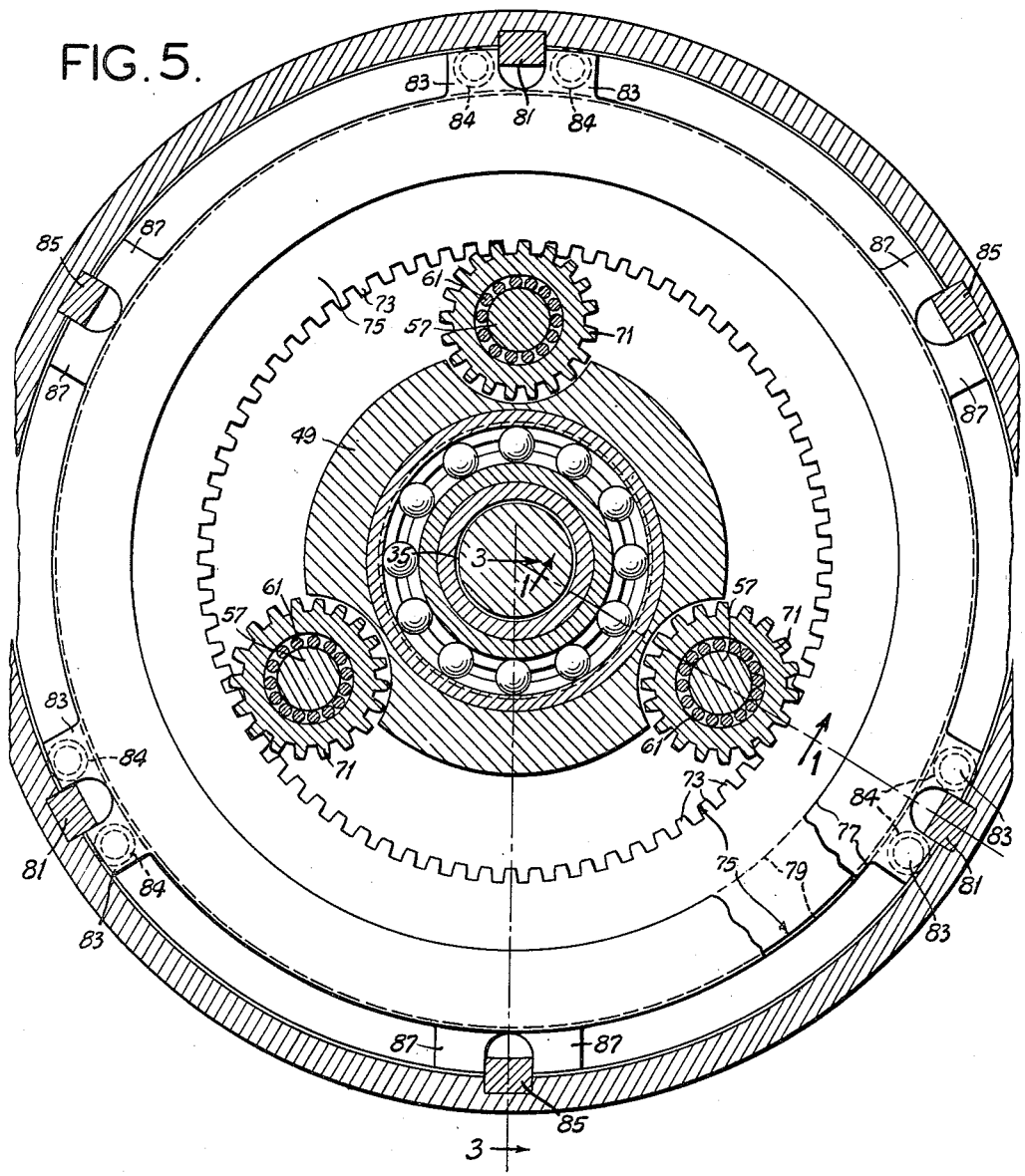

Dec. 21, 1954  M. P. WINTHER ET AL  2,697,368
AUTOMOTIVE TRANSMISSION AND RETARDER
Filed Jan. 21, 1952  7 Sheets-Sheet 6
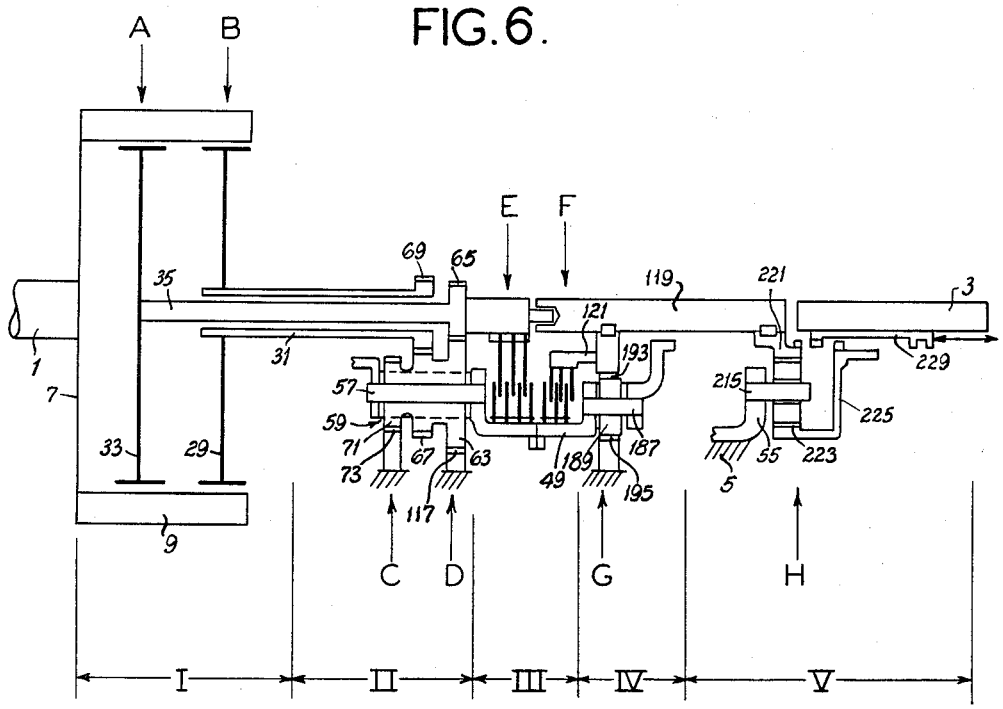
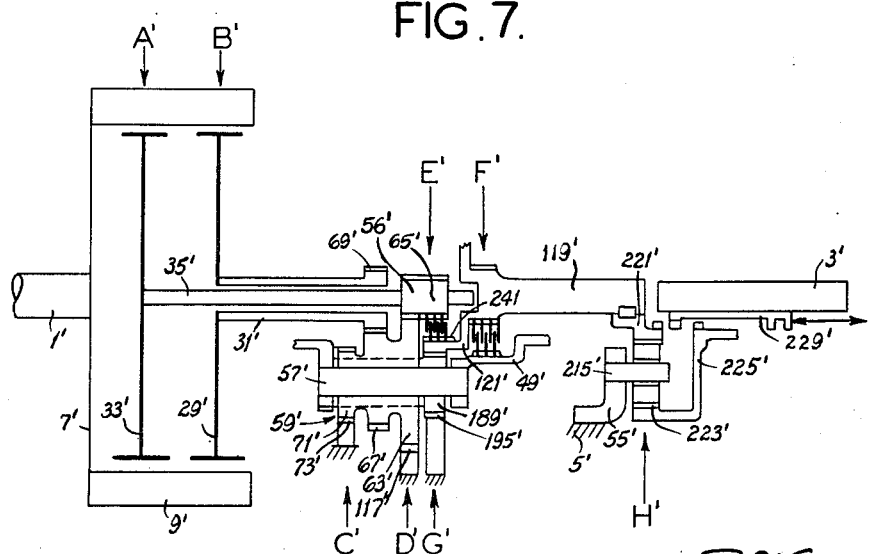

United States Patent Office 2,697,368
Patented Dec. 21, 1954

2,697,368

AUTOMOTIVE TRANSMISSION AND RETARDER

Martin P. Winther, Gates Mills, and Andrew S. Gill, Jr., Maple Heights, Ohio, assignors, by direct and mesne assignments, to Eaton Manufacturing Company, Cleveland, Ohio, a corporation of Ohio Application January 21, 1952, Serial No. 267,420

18 Claims. (Cl. 74—769)

This invention relates to automotive transmissions and retarders, and with regard to certain more specific features, to apparatus of this class primarily for heavy-duty service such as encountered in the operation of trucks, busses and the like.

Among the several objects of the invention may be noted the provision of a transmission incorporating a large number of speed and torque changes (nine or ten, exclusive of reverse in the examples given) in a relatively small space and employing but few gears and gear trains; the provision of apparatus of the class described incorporating vehicle retarding means which, without structural complication, are capable of absorbing considerable energy, thus saving wear on the usual vehicle friction brakes; and the provision of apparatus of the class described which is designed so as readily to be automatically controlled from any suitable electric and hydraulic control system. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a side elevation, half in axial section, of one form of the entire transmission, the lower-half section being on line 1—1 of Fig. 5;

Fig. 3 is an enlarged axial sectional view taken on line 3—3 of Fig. 5, showing what is hereinafter referred to as a primary planetary gear converter section II, a clutch section III, and a high- and low-range gear section IV, being similar to similarly labeled portions of Fig. 1, except that the plane of the section of Fig. 1 is at 60° with respect to that of Fig. 3;

Fig. 4 is an enlarged axial sectional view showing a reverse gear section V and a driven or tail shaft section VI;

Fig. 5 is a cross section taken on line 5—5 of Fig. 3;

Fig. 6 is a schematic view of the nine-speed form of the invention shown in Figs. 1–5;

Fig. 7 is a view similar to Fig. 6, showing an alternative nine-speed form of the invention;

Fig. 8 is a view similar to Fig. 6, showing a ten-speed form of the invention; and, Fig. 9 is a table of operating functions.

Similar reference characters indicate corresponding parts throughout the several views of the drawings.

There is a need for a heavy-duty transmission having a high number of speed and torque changes accomplished by a small number of gears encompassed in a relatively small space. It is required that such a transmission shall be adaptable to suitable automatic control. There is also need for transmission equipment which will reduce brake wear, which is becoming increasingly costly on heavy vehicles and more difficult to cope with from the standpoint of maintenance. This problem is becoming increasingly acute because of the complexities of modern traffic patterns and the requirement for continuous maximum safe speed on the open road. The present invention is an economical and effective solution to these problems.

GENERAL ARRANGEMENT

Figure 1:
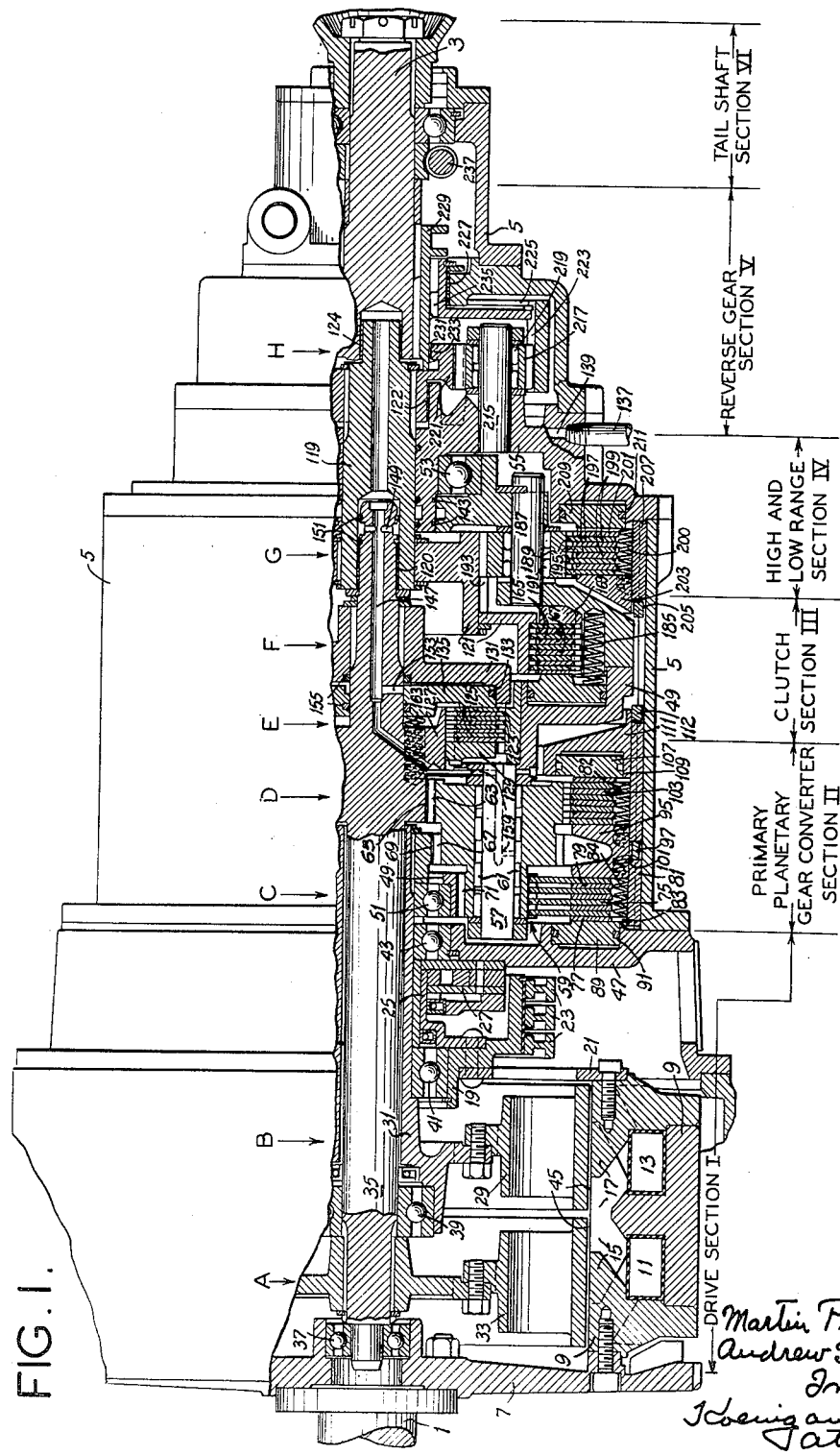

Referring now more particularly to Figs. 1 and 6, which show one form of the entire transmission:
Index I indicates an inductor-clutch drive section;
Index II indicates a primary planetary gear converter section;
Index III indicates a clutch section;
Index IV indicates a high- and low-range gear section;
Index V indicates a reverse gear section; and,
Index VI indicates a tail shaft or final and governor drive section.

DESCRIPTION OF PARTS

Figure 2:
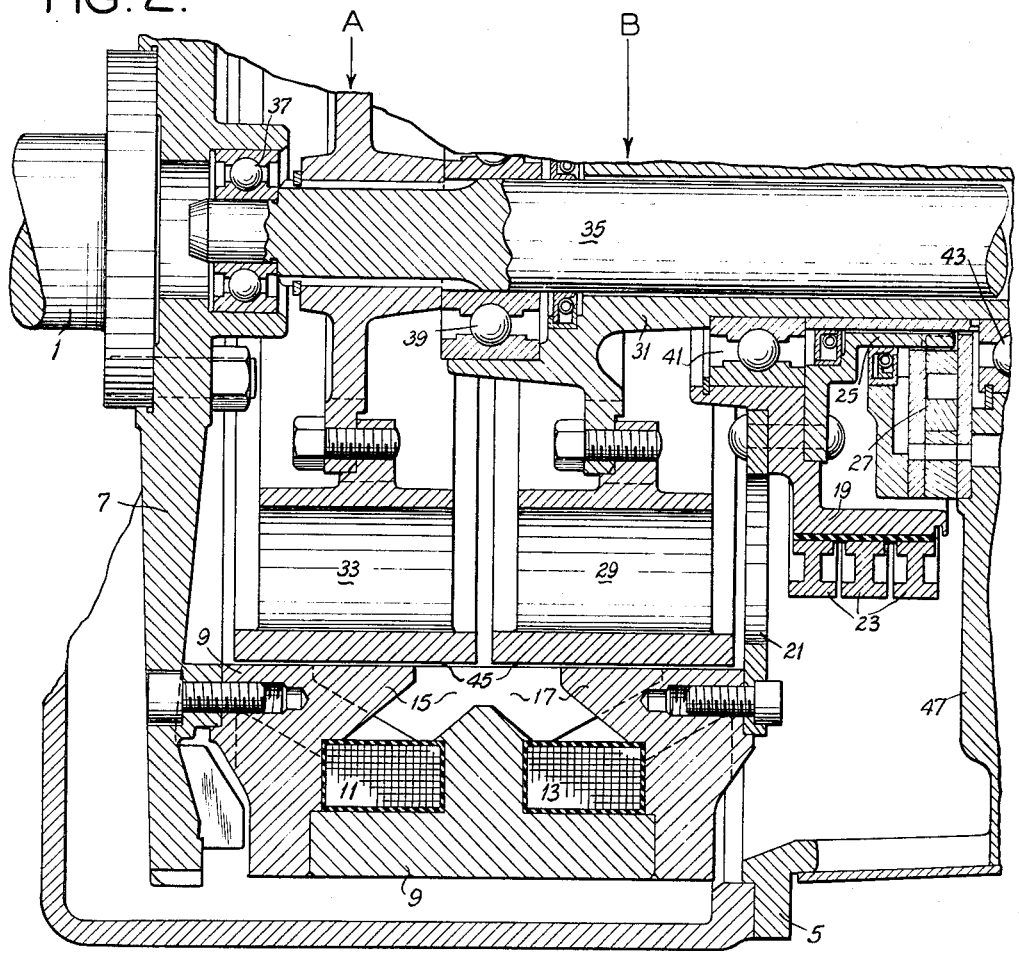
Fig. 2 is an enlarged axial sectional view showing two electric inductor drives, hereinafter called the drive section I.

Referring to Fig. 1, numeral 1 indicates a drive shaft coupled to the prime mover (not shown) of the vehicle served by the transmission, and numeral 3 indicates the driven or tail shaft which is coupled to the vehicle drive shaft (not shown). These shafts 1 and 3 are supported in a transmission case 5. The drive shaft 1 carries a flywheel 7 to which is attached an electromagnetic field member 9 in which are wound two annular electric field coils 11 and 13 (Fig. 2). The member 9 supplies some of the inertia for fly wheel functions. The field member 9 is provided with a ring of interdigitated north and south magnetic poles 15 served by the coil 11, and a second ring of interdigitated north and south magnetic poles 17 served by the coil 13. The field member 9 is connected to a supporting hub 19 by a plate 21. The hub 19 carries collector rings 23 contacted by collector brushes (not shown). One of the rings 23 is in a common return circuit for the coils 11 and 13, and the others respectively serve current to the coils 11 and 13 for excitation purposes. Suitable switches in the circuit (not shown) allow the coils 11 and 13 to be excited individually or simultaneously. The common return collector ring may be dispensed with if a grounded circuit is used. An extension 25 from the hub 19 drives an oil pump 27 which supplies oil pressure to any suitable hydraulic control circuit (not shown). Neither details of this pump, nor of the hydraulic or electric control circuits are described herein because the invention relates to the transmission structure per se, which is adaptable for use with any of suitable types of such circuits. Such circuits may be served by any of various suitable pumps and voltage sources.

The coil 11 serves a first inductor coupling indicated generally at A. The coil 13 serves a second inductor coupling indicated generally at B. Coupling A consists of the coil 11 with interdigitated field poles 15 and an inner inductor drum 33 mounted on a shaft 35, the latter reaching through a quill 31. Coupling B consists of the coil 13 with interdigitated field poles 17 and an inner inductor drum 29 mounted on the quill 31. Pilot bearings are arranged as follows: 37 between shaft 35 and flywheel 7; 39 between shaft 35 and quill 31; 41 between quill 31 and hub 19; and 43 between quill 31 and a separator wall 47 of the case 5. Small magnetic gaps 45 of the order of .020 inch wide exist between the field member 9 and the drums 29 and 33, respectively.

Whenever there is relative rotary motion between the field member 9 and a drum 29 or 33, and coil 13 or 11 is excited, then there is an inductive magnetic coupling between the field member 9 and the respective drum 29 or 33. This coupling is of a slipping nature, particularly during acceleration, the slip decreasing toward synchronism as vehicle speed increases. In the present embodiment, inductors A and B operate upon the principle that relative motions between the poles and the drums produce eddy currents in the inductors which in turn produce reactive fields transmitting torque. With such an arrangement, complete synchronism due to magnetic reactions is not quite attained nor is it necessary. It will be understood, however, that if known friction clutches are used or a magnetic fluid is used in the gaps 45, complete synchronism may be obtained. Inductor clutches or couplings operating upon eddy-current principles and/or upon magnetic-fluid principles, are known and further description will be unnecessary (see, for example, U. S. Patents 2,106,542, 2,525,571 and 2,548,756).

As will appear below, eddy-current inductor clutches are to be used when the transmission is to function also as a retarder.

Referring to Figs. 1, 3, 5 and 6, numeral 49 indicates a planetary carrier which is supported at its left end by means of a bearing 51 on the quill 31; and at its right end by means of a bearing 53 on a wall 55 of the case 5. This carrier 49 incorporates three equally spaced pins 57, on each of which is a rotary planet gear cluster 59, carried on needle bearings 61. Each cluster 59 includes a large planet gear 63 meshed with a sun gear 65 on the end of shaft 35; an intermediate planet gear 67 meshed with a sun gear 69 on the end of quill 31; and a planet gear 71.

It will be understood that the designation of gears 63, 67, 71 as constituting a gear cluster is not to be taken as limited to one wherein the gears are cut from a common piece, but that this term only implies that the gears are rigidly connected as units to rotate with respect to the carrier. For example, they may be made separately and keyed or pinned together.

Planet gear 71 and planet gear 63 mesh with annular gears of unique construction. In the case of planet gears 71, each meshes with suitably hardened internal teeth 73 formed on each of a group of four (for example) disks 75. The four disks act in tandem as a laminar annular gear with which the planet gear 71 meshes. They also function as brake disks spaced and interleaved with brake retarder disks 77 and 79. Disk 77 is splined to the case 5 by means of keys 81 and lugs 83 (see Fig. 5). The disks 79 are splined to the case 5 by means of keys 85 and lugs 87. The disk 77 is backed by an annular piston 89 arranged in an annular cylinder 91 in the wall 47 of case 5. A port 93 supplies a suitable operating fluid such as oil in order to apply pressure to the piston 89, so as to apply pressure to the disks 77, 75 and 79. These disks are backed by a reaction ring 95 which is axially anchored to the case 5 by means of a split annular spring key ring 97 located in grooves in both the case and the reaction ring. The slot in the case is deep enough so that the key ring 97 springs out to disengage the slot in the periphery of the reaction ring 95. However, there are several set screws, such as the one illustrated at 99 (Fig. 3), arranged around the periphery, by which means the key ring 97 is sprung into the reaction ring 95, to anchor it axially. The keys 81 and 85 (which also anchor ring 95 peripherally) are notched as shown at 101 to accommodate the inward position of the key ring 97. Thus ring 95 is splined against rotation in the case 5 by means of keys 81 and 85 and against axial movement by ring 97.

From the above it will be clear that by applying oil pressure behind the piston 89 the brake-and-gear disks (which mesh with the planet gear 71) may be squeezed between the disk members 77, 79 and reaction ring 95, thus providing in effect a stationary ring gear to supply reaction for the planet gear 71. On the other hand, when the piston 89 is released, the disks 75 are released, thus depriving planet gear 71 of any reaction. Springs 84, reacting between the lugs of the disks 77 and reaction ring 95, serve to apply return movement to the piston 89 through disk 77. An advantage of providing for planet gear 71 a laminar meshing gear (constituted in the present example by the disks 75 having the internal teeth 73) is that tooth loads are automatically evenly distributed as the disks 75 are braked by the members 77, 79 and 95. Thus is solved the problem of eccentric tooth loading usually encountered in the design of planetary gears operating within annular gears. Moreover, by combining in the disks 75 both the functions of annular gear and brake, the construction is considerably simplified. The laminar feature in a planetary gear construction is not claimed in the present application, being the sole invention of Martin P. Winther, one of the inventors herein. It is claimed in his copending United States patent application, Serial No. 267,421, filed January 21, 1952, for Planetary Gear Train.

The planet gear 63 also meshes externally with a similar ring-gear-brake construction, consisting of said reaction ring 95, a series of brake retarder rings 103 splined to the case by means of said keys 85, and an additional ring 105 splined to the case by means of said keys 81. The ring 105 is backed up by a piston 107 located in an annular cylinder 109 of a ring 111. Member 111 is keyed to the case 5 by key ring 112, similar to ring 97 already described. Ring 111 is also held to the case 5 by keys 81. Opening springs are indicated at 82. A port 113 supplies operating fluid for the piston 107. The rings 103, 105 clamp rings 115, which also have suitably hardened internal teeth 117 with which the planet gears 63 mesh.

The planetary-gear-brake construction incorporating gear 71 will hereinafter be designated in general by index character C. The planetary-gear-brake construction incorporating gear 63 will hereinafter be designated in general by the index character D. It may be observed that, although in addition to the gears 63 and 67 used to form the cluster, the gear 71 is used, the latter might be omitted by having the teeth 73 of disks 75 mesh with the teeth of gear 67. This would affect the torque ratios obtained but similar principles of action would inhere. The above completes description of the primary planetary gear section II of Fig. 3.

Referring now to the clutch section III of Fig. 3, it is constituted by a first clutch generally designated E and a second clutch generally designated F. Clutch E connects the carrier 49 with the shaft 35. Clutch F connects the carrier 49 with an intermediate shaft 119 through a drum construction 121. Shaft 119 is supported on three sleeve bearings, i. e., 120 with respect to shaft 35; 122 with respect to wall 55 of case 5; and 124 with respect to the tail shaft 3.

Referring to clutch E, it is constituted by disks 123, splined in the carrier 49. These disks interleave disks 125, splined to a flange 127 formed on the shaft 35. A fixed backing ring 129 is attached to the flange 127. The shaft 35 is also provided with a second flange 131 forming a cylinder 133 for a piston 135 for clamping the clutch disks 123, 125, whereby shaft 35 and the carrier 49 may be coupled. Pressure is brought behind the piston from a port 137 through passages 139 and 141 in the case 5. Transfer of fluid occurs from these passages through packing glands 143, a passage 145 in shaft 119, to a passage 147 in shaft 35. Inlets 149 to the passage 147 are packed as shown at 151, and the outlet 153 to the cylinder 133 is packed as shown at 155. A throttling outlet passage 157 supplies enough lubricant to section II to reach the needle bearings 61 through oil passages 159 leading from an annular groove 161. It will be understood that sufficient applied pressure is carried in the inlet 137 to move the piston 135 to close the clutch E, despite exit of oil through the passage 157. Clutch E is normally held open by means of release springs 163.

The clutch F for connecting carrier 49 with intermediate shaft 119 is constituted by a group of disks 165, splined to the drum arrangement 121 on shaft 119; together with disks 167 splined to the carrier 49. Numeral 169 indicates a backing ring keyed to the carrier 49. An operating piston 171 is carried in a cylinder 173 of the carrier 49. Oil pressure is applied to the piston 171 through passages 175, 177, 179 and 181 of the carrier 49 (see Fig. 3), these leading from the packing gland 143 between a part 182 of the case 5 and the carrier 49. One of the several opening springs for clutch F is indicated at 185.

The carrier 49 carries a second set of pins 187 for a third planetary-gear-brake construction G. Upon pins 187 are planet gears 189, supported on needle bearings 191. Planet gears 189 mesh with teeth of sun gear 193 on a portion of the drum arrangement 121 of shaft 119. These gears 189 also mesh exteriorly with hardened internal teeth 195 of ring-gear-brake disks 197, interleaved with stationary brake retarder disks 199 (like brake disks 79 and 103, already described) and a brake disk 201 (like the brake disks 77 and 105, already described). A backing ring is shown at 203, axially keyed to the case 5 by ring 205, which is like ring 97. Ring 203 is prevented from rotating by keys 207. Brake rings 199 are splined to the case by said keys 207. Brake ring 201 is also splined to the case by suitable keys which are located outside of the section shown in Figs. 1 and 3. It will be understood that the keying arrangement of the planetary-gear-brake construction G is similar to that of the arrangements for planetary-gear-brake constructions C and D. The opening springs provided are shown at 200. An operating piston 209 in a cylinder 211 of the case 5 serves to close the planetary-gear-brake construction G, oil pressure being brought to the cylinder 211 through a port 213.

Referring now to Fig. 4, it will be seen that the part 55 of case 5 is also provided with stationary pins 215 which carry pinions 217 mounted on needle bearings 219. Pinions 217 mesh with a gear 221 on the rear end of intermediate shaft 119. These gears 217 also mesh with an internal gear 223 supported on a rotary member 225. Member 225 is rotary in a bearing 227 in case 5. Splined to shaft 3 is a sleeve 229 which has external clutch teeth 231 adapted to be engaged with internal clutch teeth 233 within gear 221 to effect a crown coupling. Clutch teeth 231 are also adapted to disengage from clutch teeth 233 and to engage internal clutch teeth 235 of member 225 when the sleeve 229 is retracted. The arrangement constitutes what will be referred to in general as reverse gear H. At numeral 237 is shown a gear set driven from shaft 3, which drives the vehicle speedometer and the governor system employed in connection with the controls for the transmission.

OPERATION

Figure 9:

The following description may be read in connection with Fig. 9, in which the term "open" when applied to electrical inductor coupling A or B means that it is de-energized and decoupled or released, and the term "closed" means that it is energized or coupled and in driving condition. The term "open" when applied to planetary gear trains C, D and G means that their ring-gear control brakes, incorporating plates 75, 115 and 197, respectively, are released. The term "closed," as applied to these trains means that the stated plates are held stationary and that the trains are in coupled or driving condition. The term "open" when applied to clutches E and F means that they are released, and the term "closed" means that they are in coupled power transmitting or driving condition.

There are four steps (1–4) in a low range of operation and four steps (5–8) in a high range, with a final direct drive, the torque ratio grading down as shown through the respective steps to provide nine speeds forward. The primary planetary gear converter section II alone is capable of producing four steps of torque and speed conversion.

Low Range

Step 1

Coupling A, planetary gear C and clutch F are coupled; coupling B, planetary gear D, clutch E and planetary gear G are released. The drive occurs through shaft 35, gears 65, 63, 71. Since plates 75 are locked, gear 71 performs a planetary action, with reaction from the teeth 73. This revolves the carrier 49. The carrier will not transmit rotation to the output shaft 3 unless either clutch F is coupled or planetary gear G is coupled. Throughout the low range of operation, clutch F is maintained coupled and the planetary gear train G is released, that is, running without reaction from plates 197. Therefore, in this Step 1, with clutch F coupled, the drive is completed through 121, 119 and 3, provided sleeve 229 is set in forward position.

Step 2

This involves releasing coupling A and closing coupling B. The drive is then through quill 31, gears 69, 67, 71, and, as for Step 1, the drive being completed through carrier 49, clutch F, shafts 119 and 3. In this case the torque ratio is reduced because the speed drop between gears 69 and 67 is lower than the speed drop between gears 65 and 63.

Step 3

This involves reclosing coupling A and reopening coupling B. Planetary train C is released, while planetary train D is coupled. The drive then is through shaft 35, gears 65, 63, the latter meshing with and revolving within locked gear plates 115, with reaction from their teeth 117. This revolves the carrier 49 at a higher speed than afforded by planetary action through formerly coupled planetary train C. Clutch F being still closed, the drive is completed through shafts 119 and 3, as directly described.

Step 4

This again involves opening clutch A and closing clutch B, all other settings remaining the same as they were for Step 3. The drive is then through quill 31, gears 69, 67 to 63, which again has planetary action within the locked gear plates 115, with reaction from teeth 117, rotating carrier 49 at a higher speed because of the smaller speed reduction between gears 69 and 67 than between gears 65 and 63. The drive, as before, is then completed from carrier 49 through shafts 119 and 3.

High Range

Throughout all of the steps for this range the clutch F is opened or released and the planetary gear G is closed or coupled. The remaining settings, as shown in Fig. 9, for Steps 5, 6, 7 and 8, correspond to those for Steps 1, 2, 3 and 4, respectively.

Steps 5, 6, 7 and 8

The drives for these steps are the same as those outlined for Steps 1, 2, 3 and 4, respectively, up to the carrier 49. From this point on the drive (instead of being direct from carrier 49 to shaft 119 through clutch F), occurs through planetary train G, i. e., planetary action of gears 189, rolling within the teeth 195 of locked gear plates 199 of the planetary gear train G. Reaction is obtained from said teeth 195, and thus gears 189 drive shaft 119 through the sun gear 193. The speed of shaft 119 for each Step 5–8 is thus greater than it was by direct drive by Steps 1–4 through the clutch F, with the results shown in the torque ratio schedule of Fig. 9.

Direct Drive

Step 9

This preferably involves energizing or closing both couplings A and B, and closing clutches E and F. Gear train G is released and planetary gears C and D are released. The following members then revolve as a unit: inductor couplings 33 and 29, shaft 35, quill 31, gear cluster 59, carrier 49 and shafts 119 and 3. It will be seen that with the stated arrangement it would in fact not be necessary to close coupling B when coupling A is closed. The same direct drive would be obtained by closing coupling A only, with the drive through shaft 35, clutch E, carrier 49, clutch F and shafts 119 and 3. It will also be seen that it would not be necessary to close coupling A when coupling B is closed because, with clutches E and F closed, the planet carrier 49 is carried with shaft 1. Clusters 59 are then locked by gear 65. Gear 69 then turns the locked system 1, 65, 59, 49, 119 and 3. However, it so happens that the current consumption from the power source (battery) can be reduced by 50 per cent during direct drive by energizing and closing both couplings A and B.

Reverse

It will be observed that for any of the nine steps above outlined, the sleeve 229 may be retracted so as to couple shaft 119 to shaft 3 through the reverted fixed-center train H constituted by gears 221, 217 and 223. The reverse torque ratio for each of the nine reverse steps is higher than for forward action in these steps because of the speed reduction through the reverse gear train H.

Alternate Reverse Arrangements

It will be noted that there is a speed reduction and torque increase in reverse which may or may not be sufficient, depending upon the gear ratio used in the axle of the vehicle. The control can be arranged to give another reverse speed torque ratio by closing inductor coupling B only (not coupling A) and closing planetary gear train D; also clutch F, while sleeve 229 is retracted (moved to the right in Figs. 1 and 4). This, through gears 69, 67, 63, teeth 117 of plates 115, carrier 49 to shaft 119, through closed clutch F, and then to shaft 3 through reverse gear train H, gives additional speed reduction in reverse. In this event clutch E would be released.

If it is desired to obtain a higher speed reverse action, some of the increased torque in reverse caused by gear 221, pinion 217 and gear 223 can be cancelled out by employing the following arrangement: close clutch E, which will directly drive the carrier 49; also close the brake of planetary gear train G, which will allow gear 189 to roll internally on teeth 195 and drive gear 193 on the intermediate shaft 119. Under these conditions, brakes of planetary gear trains C and D, and clutch F, need to be opened.

Alternative Arrangements

In Fig. 7 is shown an arrangement alternate to that of Figs. 1–6. This figure corresponds in form to Fig. 6 but shows the differences. Since all of the parts have corresponding functions, corresponding reference characters have been used, except that they have been primed.

Analogous operations will be obvious from the indexing of Fig. 7. The difference in construction is that the physical positions of the planetary gear G' and of clutch F' have been interchanged, without changing the relationship of parts which they connect and without changing their functions. One advantage is structural in that the gear 189' may be carried upon the same planetary pins 57', as is gear cluster 59'. Note in this connection that the additional pins 187 shown in Fig. 6 can be eliminated. In the case of Fig. 7, the clutch E' connects directly between shaft 35' and shaft 119' by having its inner plates splined to an extension 65' of gear 56', and its outer plates are splined directly to an additional internal clutch 241 on part 121' of shaft 119'. The clutch F' in Fig. 7 still connects shaft 119' with the carrier 49'. Operation is the same except that it is possible to connect shaft 35' and shaft 119' directly through closed clutch E'. In the case of Fig. 6, this connection is made indirectly, that is, when clutch E is closed, shaft 35 is connected to shaft 119 through the carrier 49 and clutch 121 when the latter is closed. The Fig. 7 construction has an additional advantage in that there are more variations in the control possibilities since shaft 35' can be connected with shaft 119' through clutch E' without the requirement for closing clutch F' as in Fig. 6. Thus in the case of direct drive (Step 9, Fig. 9), it is not necessary to close clutch F' when clutch E' is closed.

The operation of the Fig. 7 form of the invention may be the same as that shown in Fig. 9 for the Fig. 6 form. The index characters of Fig. 9 may then be read as if they were primed, in order to apply to Fig. 7.

Fig. 8 is a diagrammatic view of another form of the invention, wherein double-primed index characters functionally correspond to those of Figs. 6 and 7.

The relationship of parts A", B", C", D", 56" and 69" are the same as the relationships between the corresponding parts of Figs. 6 and 7. The clutch E" in Fig. 8 is arranged similarly to the clutch E' in Fig. 7, forming a direct connection between shaft 35" and intermediate shaft 119". However, the planetary gear train G" in which planet gear 189" is located may effect a different gear ratio than train G or G' in Fig. 6 or 7, respectively. The clutch F" connects directly between the carrier 49" and the intermediate shaft 119". The reverse gear train H" is the same as in Figs. 6 and 7. A desirable ten-speed operation of this form of the invention is shown in the following table, in which the left-hand column designates the speeds desired and the right-hand column indicates the elements of Fig. 8 that are closed or coupled:

| Speed | Items closed or Coupled (All Others Being Open or Released) |
| --- | --- |
| First | A", C", F". |
| Second | B", C", F". |
| Third | A", D", F". |
| Fourth | B", D", F". |
| Fifth | A", C", G". |
| Sixth | B", C", G". |
| Seventh | A", D", G". |
| Eighth | B", D", G". |
| Ninth (Direct) | A", E". |
| Tenth (Overdrive) | B", C". E". |

Obviously the same number of speeds at different ratios can be obtained by changing the reverse gear connection H". It will be observed from the mode of operation of Fig. 8 that the Fig. 7 form of the invention can be likewise operated for ten speeds forward.

RETARDER ACTION

During driving conditions, with the exception of direct drive, when one or the other of inductors 29 or 33 alone is driving, i. e., is excited, the other has relative rotary motion both with respect to the field member 9 and with respect to the other inductor. This is true under any of the operating Steps 1–8. Thus the drive, in addition to acting as an automatic speed changer and torque converter, is also capable of absorbing energy as a dynamic retarder for braking the vehicle on hills and slowing it down from high speed. If the vehicle is coasting in one of the eight steps of the low- or high-range operations, the vehicle, through the transmission, will drive the inductors 29 and 33 at different speeds relatively to member 9. This is due to the different gear train ratios that are effective between shaft 3 and each of inductors 29 and 33. Consequently, if both coils 11 and 13 are excited, retarder action will occur independently of the engine, due to the absorption of kinetic energy by generation of heat in the inductors 29 and 33. Member 9 will assume a speed which is an average of the speed of members 29 and 33, which causes the latter to react against one another via opposite electromagnetic drags on member 9. The amount of heat generated (and absorption of kinetic energy) will depend upon the gear trains employed, i. e., whether the transmission is operating in one or the other of Steps 1–8, except that there are only four retarder steps instead of eight. Thus for drive Steps 1 and 2 there is on retarder step; for Steps 3 and 4 another retarder step, et cetera. Selections for retarder torque can be made in the manner already made clear, observing that for greatest retardation the speeds of 29 and 33 differ the most.

Thus the first step of retardation and the highest retarding torque ratio will correspond to step sequences 1 and 2 in Fig. 8, with clutches A and B both energized. The next lower retarder torque ratio corresponds to Steps 3 and 4; the next lower to Steps 5 and 6; and the lowest to Steps 7 and 8. Retarder action is also effective as a retarder against backward coasting, except in direct-drive connection.

In direct drive, either in forward or reverse, both inductors 29 and 33 are rotating in the same direction at the same speed, and since either coil 11 alone, or coils 11 and 13 together are then energized, it is only the engine friction that functions as a slight retardation in the usual way under direct-drive coasting conditions.

If advantage is to be taken of this retarder action, the inductor clutches or couplings A and B should be of the current inductor type shown, or its equivalent, as distinguished from the magnetic-fluid type, or the ordinary friction type. The latter types may be used only when retarder action is not desired.

Cross reference is here made to the related application Serial No. 257,623 of Jerrold B. Winther, filed November 21, 1951, for Clutch-Brake Mechanism and containing claims directed to a transmission incorporating multiple clutches for torque change and braking.

It is not necessary that the member 9 be the field member and the members 29 and 33 the inductor members (as shown), but this arrangement may be reversed and the member 9 may constitute a common inductor for the members 29 and 33, each of which may be a field member carrying an exciting coil. This is a mere electrical inversion and an equivalent and further description will be unnecessary in view of the common knowledge in the art of such an inversion.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A transmission comprising a driving element, first and second clutches driven thereby, first and second sun gears driven by the first and second clutches respectively, a rotary carrier, a planetary gear cluster supported by the carrier and having first and second planet gears meshing with the first and second sun gears respectively and having a third planet gear, first and second annular gears respectively meshing with the first and third gears respectively of the cluster, individual brakes for said annular gears, a driven member carrying a third sun gear, a fourth planet gear on the carrier meshing with said third sun gear, a third annular gear meshing with said fourth planet gear, and a brake for said third annular gear.

2. A transmission made according to claim 1, including clutch means for connecting the carrier with said driven member.

3. A transmission made according to claim 2, including clutch means adapted to place said first clutch in driving connection with said driven member.

4. A transmission comprising a driving element, first and second clutches driven thereby, first and second sun gears driven by the first and second clutches respectively, a rotary carrier, a planetary gear cluster supported by the carrier and having first and second planet gears meshing with the first and second sun gears respectively, first and second annular gears respectively meshing with certain gears of the cluster, individual brakes for said annular gears, a driven member carrying a third sun gear, a planet gear on the carrier meshing with said third sun gear and adapted for rotation on its own axis which is different from that of said cluster, a third annular gear meshing with said last-mentioned planet gear, and a brake for said third annular gear.

5. A transmission made according to claim 4, including clutch means for connecting the carrier with said driven member.

6. A transmission made according to claim 5, including clutch means adapted to place said first clutch in driving connection with said driven member.

7. A transmission made according to claim 6, wherein said clutch means are operatively connected in series to make said driving connection.

8. A transmission made according to claim 6, wherein said clutch means are operative independently to make said driving connection.

9. A transmission made according to claim 4, wherein said first and second clutches are of the electrical inductor slip type adapted selectively to be individually or simultaneously excited and generating heat when slipping while excited, said clutches having a common electrical driving member connected with the driving element and having individual electrical driven elements geared through said cluster so as to have movements relative to one another and to the driving member, whereby, when under coasting action of the transmission the rotary carrier tends to drive the clutch-driven elements through said cluster, said clutches when excited will react upon one another through said driving member converting kinetic energy into heat and functioning as a retarder for decelerating the carrier.

10. A transmission comprising a driving element, selectively and simultaneously operable first and second inductor clutches having first and second driven members driven thereby, first and second sun gears driven by said first and second driven members respectively, a rotary carrier, a planetary gear cluster supported by the carrier and having first and second planet gears meshing with the first and second sun gears respectively and having a third planet gear, first and second annular gears one of which meshes with said third planet gear of the cluster and the other with one of the other planet gears of the cluster, selectively operable first and second individual brakes for said first and second annular gears, a third driven member carrying a third sun gear, a fourth planet gear on the carrier meshing with said third sun gear and adapted for rotation which is different from that of said cluster, a third annular gear meshing with said fourth planet gear, a selectively operable third brake for said third annular gear, and selectively operable friction clutch means for connecting the carrier with the third driven member when the third brake is inoperative.

11. A transmission comprising a driving element, selectively and simultaneously operable first and second inductor clutches having first and second driven members driven thereby, first and second sun gears driven by said first and second driven members respectively, a rotary carrier, a planetary gear cluster supported by the carrier and having first and second planet gears meshing with the first and second sun gears respectively and having a third planet gear, first and second annular gears one of which meshes with said third planet gear of the cluster and the other with one of the other gears of the cluster, selectively operable first and second individual brakes for said first and second annular gears, a third driven member carrying a third sun gear, a fourth planet gear on the carrier meshing with said third sun gear and adapted for rotation which is different from that of said cluster, a third annular gear meshing with said fourth planet gear, a selectively operable third brake for said third annular gear, selectively operable friction clutch means for connecting the carrier with the third driven member when the third brake is inoperative, and a selectively operable friction clutch adapted to effect a connection between said first driven member and said third driven member.

12. A transmission comprising a driving element, first and second inductor clutches having a common driving member, first and second driven members driven thereby, first and second sun gears driven by said first and second driven members respectively, a rotary carrier, a planetary gear cluster supported by the carrier and having first and second planet gears meshing with the first and second sun gears respectively and having a third planet gear, first and second annular gears one of which meshes with said third planet gear of the cluster and the other with one of the other planet gears of the cluster, selectively operable first and second individual brakes for said first and second annular gears, a third driven member carrying a third sun gear, a fourth planet gear on the carrier meshing with said third sun gear and adapted for rotation which is different from that of said cluster, a third annular gear meshing with said fourth planet gear, a selectively operable third brake for said third annular gear, first selectively operable friction clutch means for connecting the carrier with the third driven member when the third brake is inoperative, second selectively operable friction clutch means adapted to effect a connection between said first driven member and said third driven member, said inductor clutches being adapted for individual and simultaneous excitation, whereby when said second friction clutch is open and either the first friction clutch means is open and the third brake is operative or said third brake is inoperative and the third friction clutch is closed, said first and second clutch-driven elements are relatively rotary with respect to their common driving member, so that upon simultaneous excitation of the current inductor clutches electric heating will occur at the expense of kinetic energy with resultant retarding action effected thereby.

13. A transmission and retarder comprising a driving element, first and second inductor clutches of the electrical inductor slip type adapted selectively to be individually or simultaneously excited and generating heat when slipping while excited, said clutches having a common electrical driving member and first and second electrical driven members, first and second sun gears driven by said first and second driven members respectively, a rotary carrier, a planetary gear cluster supported by the carrier and including first and second planet gears meshing with the first and second sun gears respectively said cluster predetermining relative movements between said electrical driven members and the electrical driving member, first and second annular gears each of which meshes with a planet gear of the cluster, and selectively operable first and second individual brakes for said first and second annular gears, whereby said carrier is adapted to be driven at a different torque ratio from each clutch when respectively individually excited, and said carrier is adapted to drive said electrical driven members of the inductor clutches relative to one another and relative to said common electrical driving member so that when both inductor clutches are excited they react upon one another while generating heat to function as a retarder.

14. A transmission and retarder comprising a driving element, first and second inductor clutches having a common driving member and first and second driven members, first and second sun gears driven by said first and second driven members respectively, a rotary carrier, a planetary gear cluster supported by the carrier and including first and second planet gears meshing with the first and second sun gears respectively, first and second annular gears each of which meshes with an appropriate planet gear of the cluster, selectively operable first and second individual brakes for said first and second annular gears, whereby said carrier is adapted to be driven at a different torque ratio from each clutch when respectively excited and adapted to drive the inductor clutch driven members relatively to said inductor clutch driving member, a driven element, a planetary gear train connecting the carrier and said driven element, said last-named train including a sun gear on the driven element, a planet gear on the carrier and an annular gear meshing with the planet gear, and a third individual brake for said last-named annular gear.

15. Apparatus made according to claim 14, including a selectively operable clutch between said driven element and said carrier.

16. Apparatus made according to claim 15, including a selectively operable clutch operative between said driven element and said first inductor clutch.

17. A transmission comprising a casing, first and second drive means and a driven shaft in said casing, a first sun gear located in one plane on the first drive means and a second sun gear located in another plane on the second drive means, a third sun gear which is located on the driven shaft, a rotary carrier carrying a first gear cluster having a first planet gear meshing with the first sun gear, a second planet gear meshing with the second sun gear and a third planet gear, said carrier also having a fourth planet gear meshing with said third sun gear, annular gears in the casing respectively meshing with said second, third and fourth planet gears, brake means in the casing adapted selectively to brake and release the respective annular gears, and first and second clutches adapted respectively to connect one of the drive means with the carrier and the carrier with the driven shaft.

18. A transmission comprising a casing, first and second drive means and a driven shaft in said casing, a first sun gear located in one plane on the first drive means and a second sun gear located in another plane on the second drive means, a third sun gear which is located on the driven shaft, a rotary carrier carrying a first gear cluster having a first planet gear meshing with the first sun gear, a second planet gear meshing with the second sun gear and a third planet gear, said carrier also having a fourth planet gear meshing with said third sun gear, annular gears in the casing meshing with said second, third and fourth planet gears, brake means in the casing adapted selectively to brake or release the respective annular gears, a first clutch adapted to connect the second drive means with the driven shaft, and a second clutch adapted to connect the carrier with the driven shaft.

References Cited in the file of this patent

UNITED STATES PATENTS

| Number | Name | Date |
|---|---|---|
| 654,798 | Leary | July 31, 1900 |
| 716,929 | Ough | Dec. 30, 1902 |
| 1,152,735 | Jones | Sept. 7, 1915 |
| 1,717,466 | Reece et al. | June 18, 1929 |
| 1,857,365 | Dodge | May 10, 1932 |
| 2,045,612 | Padgett | June 30, 1936 |
| 2,208,041 | Novin | July 16, 1940 |
| 2,271,640 | Heintz | Feb. 3, 1942 |
| 2,343,955 | Cotterman | Mar. 14, 1944 |
| 2,529,423 | Schou | Nov. 7, 1950 |
| 2,548,756 | Winther | Apr. 10, 1951 |
| 2,549,896 | Dunham | Apr. 24, 1951 |
| 2,565,494 | Gilfillan | Aug. 28, 1951 |
| 2,605,651 | Winther | Aug. 5, 1952 |

FOREIGN PATENTS

| Number | Country | Date |
|---|---|---|
| 185,836 | Great Britain | Sept. 11, 1922 |
| 119,651 | Great Britain | July 29, 1919 |
| 150,356 | Germany | Apr. 13, 1904 |